United States Patent
Modavis

(10) Patent No.: US 10,107,983 B2
(45) Date of Patent: Oct. 23, 2018

(54) PREFERENTIAL MODE COUPLING FOR ENHANCED TRACEABLE PATCH CORD PERFORMANCE

(71) Applicant: Corning Optical Communications LLC, Hickory, NC (US)

(72) Inventor: Robert Adam Modavis, Painted Post, NY (US)

(73) Assignee: Corning Optical Communications LLC, Hickory, NC (US)

(*) Notice: Subject to any disclaimer, the term of this patent is extended or adjusted under 35 U.S.C. 154(b) by 0 days.

(21) Appl. No.: 15/142,853

(22) Filed: Apr. 29, 2016

(65) Prior Publication Data

US 2017/0315318 A1    Nov. 2, 2017

(51) Int. Cl.
*F21V 8/00* (2006.01)
*G02B 6/44* (2006.01)
*G02B 6/14* (2006.01)

(52) U.S. Cl.
CPC ............. *G02B 6/447* (2013.01); *G02B 6/001* (2013.01); *G02B 6/14* (2013.01); *G02B 6/4495* (2013.01)

(58) Field of Classification Search
CPC .......... G02B 6/447; G02B 6/14; G02B 6/001; G02B 6/4495
See application file for complete search history.

(56) References Cited

U.S. PATENT DOCUMENTS 3,942,859 A    3/1976  Korodi
4,179,187 A *  12/1979 Maurer ................ C03B 37/014
                                                      385/123
4,412,936 A    11/1983 Khmelkov et al.
4,466,697 A *  8/1984  Daniel ................... A47G 19/16
                                                      264/1.24
4,557,552 A    12/1985 Newton et al.
(Continued)

FOREIGN PATENT DOCUMENTS

CN    200941319 Y    8/2007
CN    201419706 Y    3/2010
(Continued)

OTHER PUBLICATIONS

International Search Report and Written Opinion PCT/US2017/012899 dated Mar. 9, 2017.
(Continued)

*Primary Examiner* — Donald Raleigh
(74) *Attorney, Agent, or Firm* — Robert L. Branham

(57) ABSTRACT

A traceable cable and method of forming the same. The cable includes at least one data transmission element, a jacket, and a side-emitting optical fiber. The side-emitting optical fiber includes a core having a first index of refraction and a cladding having a second index of refraction that is different than the first index of refraction. The cladding substantially surrounding the core and has an exterior surface with spaced apart scattering sites penetrating the exterior surface. The scattering sites are capable of scattering light so that the scattered light is emitted from the side-emitting optical fiber at discrete locations. The core also includes one or more mode coupling features capable of changing at least some low order mode light in the side-emitting optical fiber to high order mode light, thereby increasing light emitted from the scattering sites.

17 Claims, 11 Drawing Sheets

(56) References Cited

U.S. PATENT DOCUMENTS

| | | | |
|---|---|---|---|
| 4,637,686 A | 1/1987 | Iwamoto et al. |
| 4,755,018 A | 7/1988 | Heng et al. |
| 4,763,984 A | 8/1988 | Awai et al. |
| 4,923,274 A | 5/1990 | Dean |
| 4,995,691 A | 2/1991 | Purcell, Jr. |
| 5,006,806 A | 4/1991 | Rippingale et al. |
| 5,017,873 A | 5/1991 | Rippingale et al. |
| 5,040,867 A | 8/1991 | De Jong et al. |
| 5,122,750 A | 6/1992 | Rippingale et al. |
| 5,179,611 A | 1/1993 | Umeda et al. |
| 5,206,065 A | 4/1993 | Rippingale et al. |
| 5,305,405 A | 4/1994 | Emmons et al. |
| 5,329,348 A | 7/1994 | Nimura et al. |
| 5,333,228 A | 7/1994 | Kingstone |
| 5,377,292 A | 12/1994 | Bartling et al. |
| 5,394,496 A | 2/1995 | Caldwell et al. |
| 5,395,362 A | 3/1995 | Sacharoff et al. |
| 5,432,876 A | 7/1995 | Appeldorn et al. |
| 5,463,706 A | 10/1995 | Dumont et al. |
| 5,500,913 A | 3/1996 | Allen et al. |
| 5,591,160 A | 1/1997 | Reynard |
| 5,615,295 A * | 3/1997 | Yoshida | C03B 37/027 385/123 |
| 5,651,080 A * | 7/1997 | Chu | G02B 6/14 385/24 |
| 5,666,453 A | 9/1997 | Dannenmann |
| 5,703,978 A * | 12/1997 | DiGiovanni | G02B 6/02095 359/337.21 |
| 5,708,740 A * | 1/1998 | Cullen | G02B 6/02071 385/39 |
| 5,741,152 A | 4/1998 | Boutros |
| 5,764,043 A | 6/1998 | Czosnowski et al. |
| 5,835,654 A | 11/1998 | Bergmann |
| 5,982,967 A | 11/1999 | Mathis et al. |
| 6,126,325 A | 10/2000 | Yamane et al. |
| 6,137,928 A | 10/2000 | Albrecht |
| 6,137,935 A | 10/2000 | Bohme et al. |
| 6,173,097 B1 | 1/2001 | Throckmorton et al. |
| 6,257,750 B1 | 7/2001 | Strasser et al. |
| 6,293,081 B1 | 9/2001 | Grulick et al. |
| 6,301,418 B1 | 10/2001 | Freier et al. |
| 6,311,000 B1 | 10/2001 | Schneider |
| 6,314,713 B1 | 11/2001 | Fitz et al. |
| 6,317,553 B1 | 11/2001 | Harper, Jr. et al. |
| 6,347,112 B1 | 2/2002 | Keller et al. |
| 6,347,172 B1 | 2/2002 | Keller et al. |
| 6,356,690 B1 | 3/2002 | McAlpine et al. |
| 6,379,054 B2 | 4/2002 | Throckmorton et al. |
| 6,388,194 B1 | 5/2002 | Ryeczek |
| 6,403,947 B1 | 6/2002 | Hoyt et al. |
| 6,415,079 B1 * | 7/2002 | Burdge | C03B 37/0122 385/37 |
| 6,425,694 B1 | 7/2002 | Szilagyi et al. |
| 6,439,780 B1 | 8/2002 | Mudd et al. |
| 6,456,768 B1 | 9/2002 | Boncek et al. |
| 6,456,785 B1 | 9/2002 | Evans |
| 6,471,412 B1 | 10/2002 | Belenkiy et al. |
| 6,519,396 B2 | 2/2003 | Schneider et al. |
| 6,526,200 B1 | 2/2003 | Davie |
| 6,532,328 B1 | 3/2003 | Kline |
| 6,554,485 B1 | 4/2003 | Beatty et al. |
| 6,560,390 B2 | 5/2003 | Grulick et al. |
| 6,577,243 B1 | 6/2003 | Dannenmann et al. |
| 6,596,943 B1 | 7/2003 | Ward |
| 6,606,431 B2 | 8/2003 | Unsworth |
| 6,678,449 B2 | 1/2004 | Thompson et al. |
| 6,695,491 B1 | 2/2004 | Leeman et al. |
| 6,710,254 B2 | 3/2004 | Yueh |
| 6,712,524 B2 | 3/2004 | Beatty et al. |
| 6,728,453 B2 | 4/2004 | Petryszak |
| 6,798,956 B2 | 9/2004 | Morrison |
| 6,816,661 B1 | 11/2004 | Barnes et al. |
| 6,823,120 B2 | 11/2004 | Hurley et al. |
| 6,906,505 B2 | 6/2005 | Brunet et al. |
| 6,933,438 B1 | 8/2005 | Watts et al. |
| 6,969,273 B2 | 11/2005 | Chen |
| 6,979,223 B2 | 12/2005 | Chen |
| 7,020,369 B2 | 3/2006 | Lodge, Jr. et al. |
| 7,029,137 B2 | 4/2006 | Lionetti et al. |
| 7,038,135 B1 | 5/2006 | Chan et al. |
| 7,049,937 B1 | 5/2006 | Zweig et al. |
| 7,090,411 B2 | 8/2006 | Brown |
| 7,121,707 B2 | 10/2006 | Currie et al. |
| 7,164,819 B2 | 1/2007 | Jenson et al. |
| 7,217,152 B1 | 5/2007 | Xin et al. |
| 7,221,284 B2 | 5/2007 | Scherer et al. |
| 7,242,831 B2 | 7/2007 | Fee |
| 7,313,304 B2 | 12/2007 | Andrews et al. |
| 7,401,961 B2 | 7/2008 | Longatti et al. |
| 7,406,231 B1 | 7/2008 | Beck et al. |
| 7,433,565 B2 | 10/2008 | Joseph et al. |
| 7,524,082 B2 | 4/2009 | North |
| 7,544,909 B2 | 6/2009 | Dhir |
| 7,572,066 B2 | 8/2009 | De Jong et al. |
| 7,596,293 B2 | 9/2009 | Isenhour et al. |
| 7,603,020 B1 | 10/2009 | Wakileh et al. |
| 7,618,175 B1 | 11/2009 | Hulse |
| 7,653,277 B2 | 1/2010 | Andrews et al. |
| 7,671,279 B2 | 3/2010 | Yin |
| 7,748,860 B2 | 7/2010 | Brunet |
| 7,817,884 B2 | 10/2010 | Demeritt et al. |
| 7,920,764 B2 | 4/2011 | Kewitsch |
| 7,932,805 B2 | 4/2011 | Darr et al. |
| 7,948,226 B2 | 5/2011 | Rathbun, II et al. |
| 8,000,576 B2 | 8/2011 | Chen et al. |
| 8,102,169 B2 | 1/2012 | Law et al. |
| 8,150,227 B2 | 4/2012 | Kewitsch |
| 8,152,385 B2 | 4/2012 | De Jong et al. |
| 8,167,471 B1 | 5/2012 | Moritz |
| 8,314,603 B2 | 11/2012 | Russell |
| 8,322,871 B1 | 12/2012 | Knaggs et al. |
| 8,331,752 B2 | 12/2012 | Biribuze et al. |
| 8,408,029 B2 | 4/2013 | De Angelis et al. |
| 8,414,319 B2 | 4/2013 | Patel et al. |
| 8,428,405 B2 | 4/2013 | Kewitsch |
| 8,492,448 B2 | 7/2013 | Dewa et al. |
| 8,509,579 B2 | 8/2013 | Martin-Lopez |
| 8,545,076 B2 | 10/2013 | Bickham et al. |
| 8,548,293 B2 | 10/2013 | Kachmar |
| 8,582,939 B2 | 11/2013 | Gimblet et al. |
| 8,582,940 B2 | 11/2013 | Abernathy et al. |
| 8,591,087 B2 | 11/2013 | Bickham et al. |
| 8,620,123 B2 | 12/2013 | Dean, Jr. et al. |
| 8,620,125 B2 | 12/2013 | Button et al. |
| 8,683,827 B2 | 4/2014 | De Angelis et al. |
| 8,708,724 B2 | 4/2014 | Patel et al. |
| 8,724,842 B2 | 5/2014 | Sumitani et al. |
| 8,724,942 B2 | 5/2014 | Logunov et al. |
| 8,770,525 B2 | 7/2014 | Donaldson et al. |
| 8,787,717 B2 | 7/2014 | Logunov |
| 8,791,829 B2 | 7/2014 | Gustafsson et al. |
| 8,798,419 B2 | 8/2014 | Wessels, Jr. et al. |
| 8,805,141 B2 | 8/2014 | Fewkes et al. |
| 8,896,286 B2 | 11/2014 | Abuelsaad et al. |
| 8,896,287 B2 | 11/2014 | Abuelsaad et al. |
| 8,897,612 B2 | 11/2014 | Logunov |
| 8,903,212 B2 | 12/2014 | Kachmar |
| 8,909,013 B1 | 12/2014 | Jiang et al. |
| 8,929,703 B2 | 1/2015 | Logunov et al. |
| 9,025,923 B2 | 5/2015 | Logunov et al. |
| 9,073,243 B2 | 7/2015 | Gimblet et al. |
| 9,146,347 B2 | 9/2015 | Logunov et al. |
| 9,182,561 B2 | 11/2015 | Bauco et al. |
| 9,196,975 B2 | 11/2015 | Scherer et al. |
| 9,271,709 B2 | 3/2016 | Grey et al. |
| 9,304,278 B1 | 4/2016 | Bauco et al. |
| 9,388,975 B2 | 7/2016 | Wenger |
| 9,429,731 B2 | 8/2016 | Bookbinder et al. |
| 9,435,713 B2 | 9/2016 | Collier et al. |
| 9,448,380 B2 | 9/2016 | Mogensen |
| 9,507,096 B2 | 11/2016 | Isenhour et al. |
| 9,529,167 B2 | 12/2016 | Wu |
| 9,541,694 B2 | 1/2017 | Tissot |

(56) References Cited

U.S. PATENT DOCUMENTS

| | | |
|---|---|---|
| 9,709,750 B1 | 7/2017 | Kuang et al. |
| 2001/0002220 A1 | 5/2001 | Trockmorton et al. |
| 2001/0048797 A1 | 12/2001 | Van Dijk et al. |
| 2002/0009282 A1 | 1/2002 | Grulick et al. |
| 2002/0036775 A1 | 3/2002 | Wolleschensky et al. |
| 2002/0037133 A1 | 3/2002 | Unsworth |
| 2002/0136497 A1 | 9/2002 | McGarry et al. |
| 2002/0185299 A1 | 12/2002 | Giebel |
| 2003/0002830 A1 | 1/2003 | Petryszak |
| 2003/0016924 A1 | 1/2003 | Thompson et al. |
| 2003/0108270 A1 | 6/2003 | Brimacombe et al. |
| 2003/0206519 A1 | 11/2003 | Sanders et al. |
| 2003/0222786 A1 | 12/2003 | Dannenmann et al. |
| 2004/0022504 A1 | 2/2004 | Hurley et al. |
| 2004/0052473 A1 | 3/2004 | Seo et al. |
| 2004/0146254 A1 | 7/2004 | Morrison |
| 2004/0160774 A1 | 8/2004 | Lionetti et al. |
| 2004/0179777 A1 | 9/2004 | Buelow, II et al. |
| 2004/0196648 A1 | 10/2004 | Franklin et al. |
| 2005/0052174 A1 | 3/2005 | Angelo et al. |
| 2005/0089284 A1 | 4/2005 | Ma |
| 2005/0212503 A1 | 9/2005 | Deibele |
| 2006/0104578 A1 | 5/2006 | Herbst |
| 2006/0133750 A1 | 6/2006 | Lee |
| 2006/0140562 A1 | 6/2006 | Joseph et al. |
| 2006/0193575 A1 | 8/2006 | Greenwood et al. |
| 2006/0232385 A1 | 10/2006 | Scherer et al. |
| 2006/0285350 A1 | 12/2006 | Wang |
| 2007/0071389 A1* | 3/2007 | Yoon .............. G02B 6/02066 385/37 |
| 2007/0116402 A1 | 5/2007 | Slade et al. |
| 2007/0153508 A1 | 7/2007 | Nall et al. |
| 2007/0217749 A1 | 9/2007 | Jong et al. |
| 2008/0080820 A1 | 4/2008 | Andrews et al. |
| 2008/0087082 A1 | 4/2008 | Andrews et al. |
| 2008/0121171 A1 | 5/2008 | Hulsey |
| 2008/0198618 A1 | 8/2008 | North |
| 2008/0204235 A1 | 8/2008 | Cook |
| 2008/0273844 A1 | 11/2008 | Kewitsch |
| 2009/0027873 A1 | 1/2009 | Tarlton |
| 2009/0297104 A1 | 12/2009 | Kachmar |
| 2009/0299440 A9 | 12/2009 | Slatkine |
| 2010/0021114 A1 | 1/2010 | Chen et al. |
| 2010/0148747 A1 | 6/2010 | Rathbun, II et al. |
| 2010/0166374 A1 | 7/2010 | Lapp |
| 2010/0274235 A1 | 10/2010 | Mihajlovic et al. |
| 2011/0034068 A1 | 2/2011 | Russell |
| 2011/0085776 A1 | 4/2011 | Biribuze et al. |
| 2011/0103747 A1 | 5/2011 | Chang et al. |
| 2011/0103757 A1 | 5/2011 | Alkemper et al. |
| 2011/0122646 A1 | 5/2011 | Bickham et al. |
| 2011/0150488 A1 | 6/2011 | Kewitsch |
| 2011/0305035 A1 | 12/2011 | Bickham et al. |
| 2012/0019900 A1 | 1/2012 | Kitson et al. |
| 2012/0219259 A1 | 8/2012 | Kewitsch |
| 2012/0275178 A1 | 11/2012 | Logunov |
| 2012/0275180 A1 | 11/2012 | Button et al. |
| 2012/0275745 A1 | 11/2012 | Logunov |
| 2013/0021597 A1 | 1/2013 | Carlson, Jr. et al. |
| 2013/0088888 A1 | 4/2013 | Fewkes et al. |
| 2013/0107565 A1 | 5/2013 | Genier |
| 2013/0201001 A1 | 8/2013 | Ratnakar |
| 2013/0209045 A1 | 8/2013 | Dean, Jr. et al. |
| 2013/0272014 A1 | 10/2013 | Logunov et al. |
| 2013/0341922 A1 | 12/2013 | Jimenez Buendia |
| 2013/0343703 A1* | 12/2013 | Genier ...................... G02B 6/32 385/33 |
| 2014/0016904 A1 | 1/2014 | Kachmar |
| 2014/0070639 A1 | 3/2014 | Tamura |
| 2014/0221763 A1 | 8/2014 | Vayser et al. |
| 2014/0227438 A1 | 8/2014 | Dean, Jr. et al. |
| 2014/0270639 A1 | 9/2014 | James, III et al. |
| 2014/0355295 A1 | 12/2014 | Kuchinisky et al. |
| 2014/0363134 A1 | 12/2014 | Bookbinder et al. |
| 2015/0043875 A1 | 2/2015 | Bookbinder et al. |
| 2015/0049992 A1 | 2/2015 | Bauco |
| 2015/0369986 A1 | 12/2015 | Logunov et al. |
| 2016/0139353 A1 | 5/2016 | Bauco et al. |
| 2016/0202418 A1 | 7/2016 | Fortin et al. |
| 2016/0231521 A1 | 8/2016 | Smith et al. |
| 2016/0313483 A1* | 10/2016 | Chomycz .............. G02B 6/001 |
| 2016/0313513 A1 | 10/2016 | Wijbrans et al. |
| 2016/0377818 A1 | 12/2016 | Tong et al. |
| 2017/0207585 A1 | 7/2017 | Butler et al. |
| 2018/0128996 A1 | 5/2018 | Sawicki et al. |

FOREIGN PATENT DOCUMENTS

| | | |
|---|---|---|
| CN | 102589728 A | 7/2012 |
| CN | 201305952 U | 7/2012 |
| CN | 203241575 U | 10/2013 |
| DE | 4413597 A1 | 10/1995 |
| DE | 10239602 B3 | 2/2004 |
| DE | 102007025494 A1 | 12/2008 |
| DE | 102009015263 A1 | 10/2010 |
| DE | 202015007044 U1 | 12/2015 |
| EP | 0874191 A2 | 10/1998 |
| EP | 0952589 A2 | 10/1999 |
| EP | 1168025 A2 | 1/2002 |
| EP | 2113969 A1 | 11/2009 |
| GB | 2260198 A | 4/1993 |
| GB | 2375898 A | 11/2002 |
| JP | 57011305 A | 6/1980 |
| JP | 59182404 A | 4/1983 |
| JP | 61139221 A | 6/1986 |
| JP | 61161827 U | 10/1986 |
| JP | 1990055506 A | 2/1990 |
| JP | 2108007 A | 4/1990 |
| JP | 2108008 A | 4/1990 |
| JP | 6017157 U | 3/1994 |
| JP | 06130253 A | 5/1994 |
| JP | 9178956 A | 7/1997 |
| JP | 9237524 A | 9/1997 |
| JP | 2008153030 A | 7/2008 |
| JP | 2009244288 A | 10/2009 |
| JP | 2010237233 A | 10/2010 |
| JP | 2013196960 A | 9/2013 |
| KR | 875507 B1 | 12/2008 |
| WO | 1998034144 A1 | 8/1998 |
| WO | 1999024856 A1 | 5/1999 |
| WO | 2000011484 A1 | 3/2000 |
| WO | 2005106899 A1 | 11/2005 |
| WO | 2006044177 A2 | 4/2006 |
| WO | 2006113114 A2 | 10/2006 |
| WO | 2007053371 A1 | 5/2007 |
| WO | 2008048955 A2 | 4/2008 |
| WO | 2010011299 A2 | 1/2010 |
| WO | 2010021896 A1 | 2/2010 |
| WO | 2011063214 A1 | 5/2011 |
| WO | 2013055842 A1 | 4/2013 |
| WO | 2013059811 A1 | 4/2013 |
| WO | 2013122825 A1 | 8/2013 |
| WO | 2014026300 A1 | 2/2014 |
| WO | 2015000194 A1 | 1/2015 |

OTHER PUBLICATIONS

Endruweit et al. "Spectroscopic experiments regarding the efficiency of side emission optical fibres in the UV-A and visible blue spectrum", Optics and Lasers in Engineering 46 (2008) pp. 97-105.
http://www.dexim.net/list.php?id=7, Dexim product reference, downloaded from the web Feb. 24, 2016. 2 pages.
Kremenakova, et al., "Characterizaion of Side EmmittingPolymeric Optical Fibres," Jounal of Fiber Bioengineering & Informatics 5:4 (2012) pp. 423-431, http://www.jfbi.org, Dec. 2012.
Fiber Optic Products, Inc., "Specifications of our Fiber and Cable," n. d. Retrieved on Aug. 9, 2013, 2 pages.
M. Rajesh, "Polymer Photonics: An Overview," Fabrication and Characterisation, 2011, 38 pages.
Schott, "SpectraStream Glass Harnesses," Rev. 11/06, 2 pages.
Spigulis, J., "Side-Emitting Fibers Brighten Our World in New Ways," Oct. 2005, Retrieved from www.osa-opn.org, 6 pages.

(56) References Cited

OTHER PUBLICATIONS

Patent Cooperation Treaty, International Search Report, Application No. PCT/US2013/025262, dated Jul. 16, 2013, 7 pages.
"Super Vision Fiber Optics Side Glow Cables, " TriN01ihLighting.com, Tri North Lighting, Inc., n. d., Web. Aug. 1, 2013.
U.S. Appl. No. 13/431,565, filed Mar. 27, 2012, David L. Dean, Jr., 32 pages.
European Search Report, Application No. 15168466.9-1553, dated Dec. 17, 2015, 9 pages.
Optical fiber with nanostructured cladding ofTi02 nanoparticles self-assembled onto a side polished fiber and its temperature sensing, Lu et al., Optics Express, vol. 22, No. 26, Dec. 29, 2014, 7 pages, downloaded from Internet on Jan. 5, 2015.
Patent Cooperation Treaty, International Search Report for PCT/US2015/060558, dated Feb. 9, 2016, 5 pages.
Patent Cooperation Treaty International Search Report, Application No. PCT/US2014/049524, dated Jan. 20, 2015, 5 pages.
"Diode Lasers, Fiber Optics, IR, Red, Green, Blue Diode Lasers, Laser Diode, Fiber Illuminators, Fiber Optics, Coupler, Galvonarneters, Laser Show Acessories," Jan. 1, 2013, httn://www.meshtel.com/, 1 oage.
Patent Cooperation Treaty, International Search Report, PCT/US2014/049525, dated Jan. 23, 2015, 18 pages.
U.S. Appl. No. 14/295,844, Bookbinder filed on Jun. 4, 2014, 25 pages.
Patent Cooperation Treaty, International Search Report and Written Opinion for International Application No. PCT/US2014/041510, dated Sep. 18, 2014, 10 pages.
International Searching Authority Invitation to Pay Additional Search Fees PCT/US2016/042416 dated Oct. 7, 2016.
International Searching Authority Invitation to Pay Additional Fees PCT/US2016/055497 dated Dec. 19, 2016.
International Search Report and Written Opinion PCT/US2016/042414 dated Oct. 5, 2016.
62/193638, 62/221769—Listed in ID as 26113.
U.S. Appl. No. 14/791,924, filed May 20, 2015.
U.S. Appl. No. 15/000,128, filed Jan. 19, 2016.
U.S. Appl. No. 15/054,380, filed Mar. 31, 2015.
U.S. Appl. No. 15/142,853, filed Apr. 29, 2016.
U.S. Appl. No. 62/193,638, filed Jul. 17, 2015.
U.S. Appl. No. 62/193,643, filed Jul. 17, 2015.
U.S. Appl. No. 62/221,769, filed Sep. 22, 2015.
U.S. Appl. No. 62/221,774, filed Sep. 22, 2015.
U.S. Appl. No. 62/248,490, filed Oct. 30, 2015.
International Search Report and Written Opinion PCT/US2016/020542 dated Jun. 7, 2016.
"Side Emitting Super Glowing Fiber." MeshTel.com. MeshTel-Intelite, Inc., 1996-2012. Web. Aug. 1, 2013.
European Search Report EP15168466 dated Dec. 17, 2015.
International Search Report and Written Opinion PCT/US2016/031624 dated Aug. 31, 2016.

\* cited by examiner

US 10,107,983 B2

PREFERENTIAL MODE COUPLING FOR ENHANCED TRACEABLE PATCH CORD PERFORMANCE

BACKGROUND

This disclosure generally relates to fiber optic cables having waveguides that scatter light from the side thereof. More particularly, this disclosure relates to cables and cable assemblies, such as patch cords, that are traceable due to the addition of at least one side-emitting optical fiber.

Today's computer networks continue to increase in size and complexity. Businesses and individuals rely on these networks to store, transmit, and receive critical data at high speeds. Even with the expansion of wireless technology, wired connections remain critical to the operation of computer networks, including enterprise data centers. Portions of these wired computer networks are regularly subject to removal, replacement, upgrade or other moves and changes. To ensure the continued proper operation of each network, the maze of cables connecting the individual components must be precisely understood and properly connected between specific ports.

In many cases, a network's cables, often called patch cords, can be required to bridge several meters across a data center. The cables may begin in one equipment rack, run through the floor or other conduit, and terminate at a component in a second equipment rack.

As a result, there is a need for a traceable cable that provides a means for the network operator to quickly identify the path and approximate terminal end of a given cable that is being replaced, relocated, or tested.

SUMMARY

The present disclosure relates to traceable cables and side-emitting waveguides used in the same. In one embodiment of this disclosure, the cable includes at least one data transmission element, a jacket at least partially surrounding the at least one data transmission element, and a side-emitting optical fiber incorporated with and extending along at least a portion of the length of the cable. The side-emitting optical fiber has a core and a cladding substantially surrounding the core to define an exterior surface. The cladding has spaced apart scattering sites penetrating the exterior surface along the length of the optical fiber. The scattering sites scatter light so that the scattered light is emitted from the side-emitting optical fiber at discrete locations. The core has mode coupling features capable of changing, or "coupling," at least some low order mode light in the side-emitting optical fiber to high order mode light. The mode coupling features are spaced apart along the length of the side-emitting optical fiber to redistribute light along the length of the fiber and to enable more uniform light emission from the scattering sites. In some cases, one or more mode coupling features are located between each pair of scattering sites. When light is transmitted through the side-emitting optical fiber, light scattered from the side-emitting optical fiber allows the cable to be traced along at least a portion of the length thereof.

The present disclosure also includes methods of forming traceable cables having at least one data transmission element and a jacket at least partially surrounding the at least one data transmission element. The methods may include forming a side-emitting optical fiber by: adding a cladding around a core to create an exterior surface, the cladding having a different index of refraction than the core, creating scattering sites in the exterior surface configured to allow the side-emitting optical fiber to scatter light therefrom, and at least partially embedding the side-emitting optical fiber within the jacket so that the side-emitting optical fiber extends along at least a portion of a length of the cable. The method may also include modifying portions of the core to create mode coupling features capable of changing at least some low order mode light in the side-emitting optical fiber to high order mode light, thereby redistributing light to enable a more uniform light emission from the scattering sites.

Additional features and advantages will be set forth in the detailed description which follows, and in part will be readily apparent to those skilled in the art. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates to side-emitting waveguides, cables, and cable assemblies using the waveguides to facilitate the traceability of the cable or cable assembly. This description also relates to methods of forming the side-emitting waveguides, cables and cable assemblies.

Figure 1:
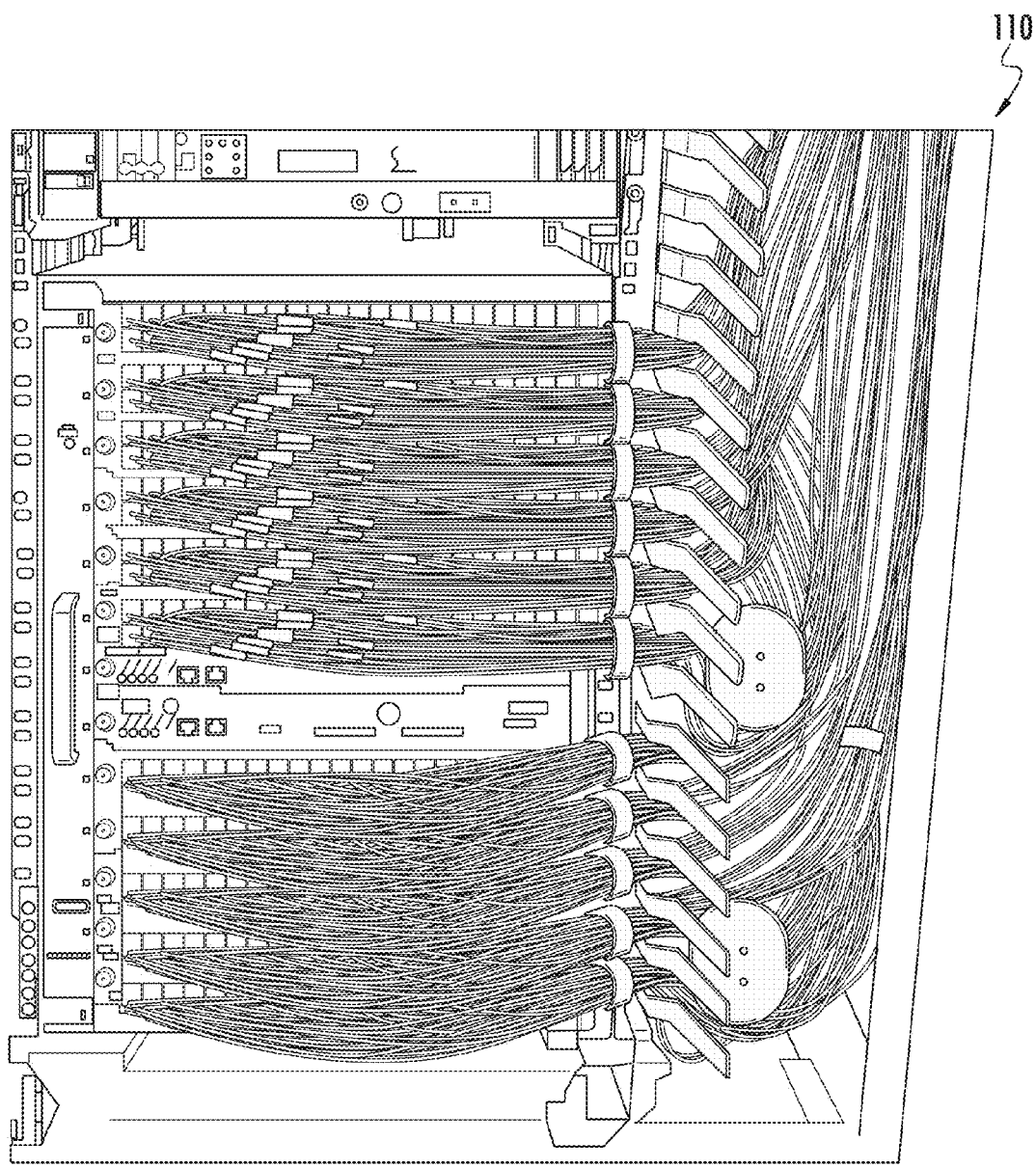
FIG. 1 is a perspective view of an equipment rack supporting patch cords.
Figure 2:
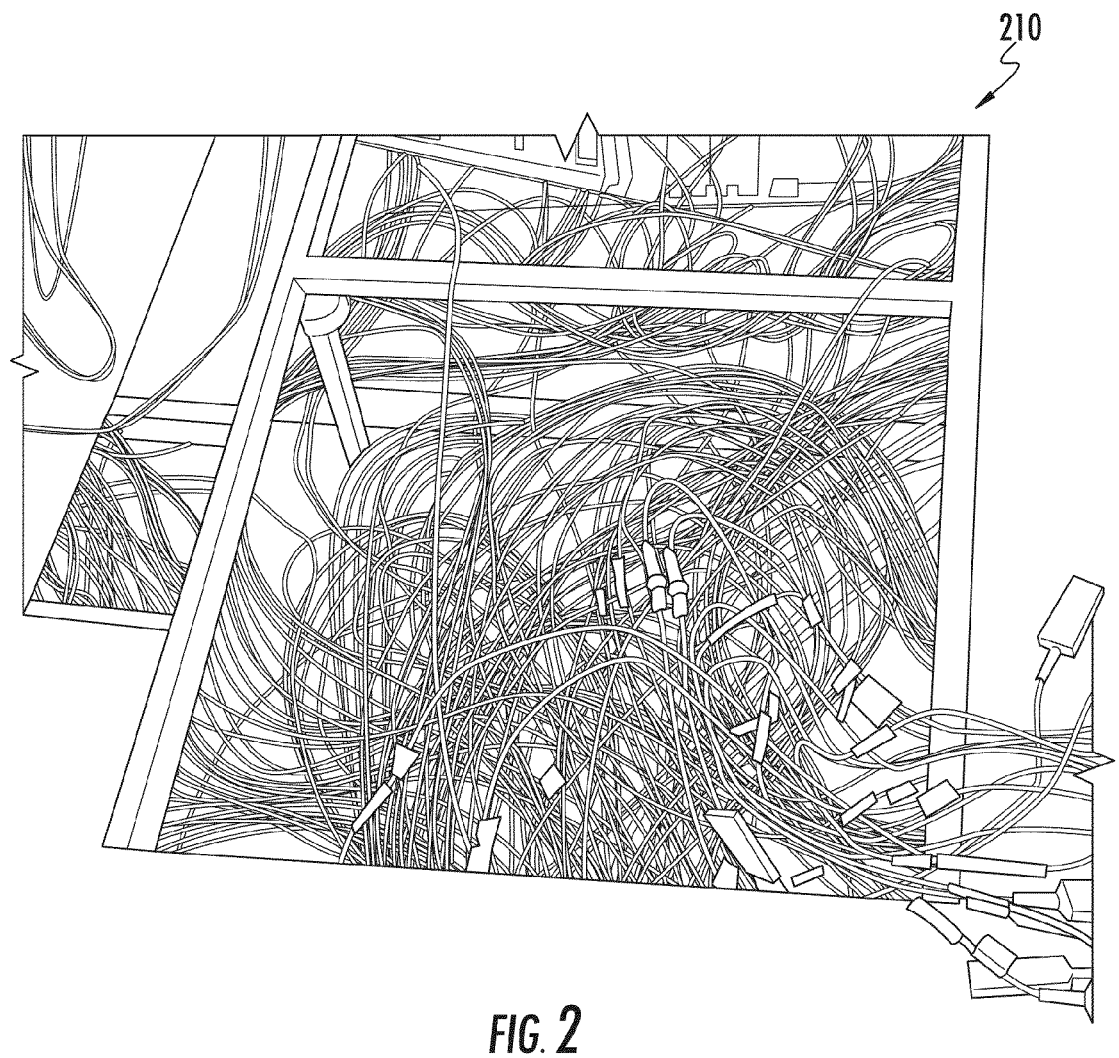
FIG. 2 is a perspective view of an under-floor cable tray supporting patch cords.

A problem that occurs in data centers or similar network locations is congestion and clutter caused by large quantities of cables. FIG. 1 shows an example of congestion in an equipment rack 110. FIG. 2 shows congestion in an underfloor cable tray 210. Network operators frequently need to change connections to accommodate moves, adds, and changes in the network. However, operators find it difficult to trace a particular cable from the source to the receiver when the network location is congested, as illustrated in FIGS. 1 and 2.

An aspect of this disclosure is the provision of side-emitting waveguides, usable within traceable cables, which provide efficient light emission that may provide visibility of the waveguide in well-lit rooms over a significant distance. Another aspect of this disclosure is the efficient manufacture of such waveguides. Yet another aspect of this disclosure is the provision of a side-emitting waveguide that provides a uniform light emission from the scattering sites along the length of the waveguide.

Figure 3:
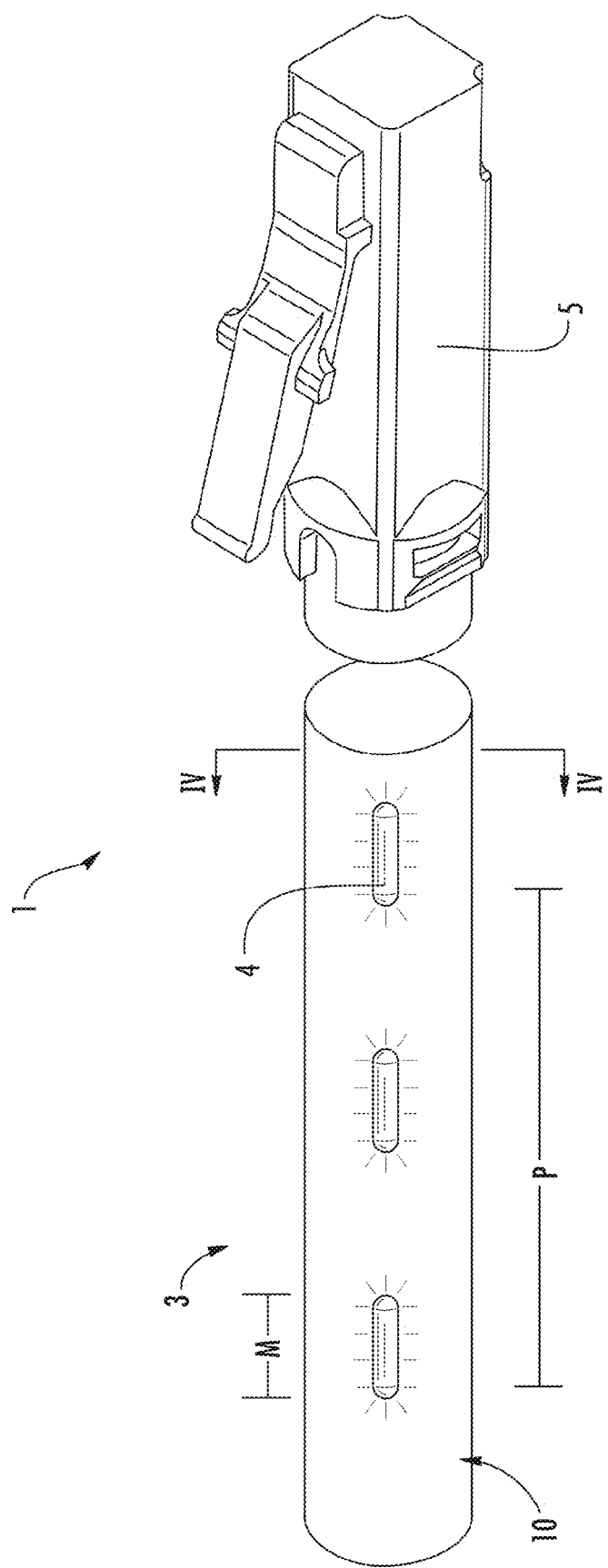
FIG. 3 is a side view, partially in cross-section, of a portion of a traceable cable assembly according to one embodiment.

FIG. 3 illustrates a cable assembly 1 with improved tracing capabilities according to embodiments of the present disclosure. The cable assembly 1 includes a cable 3, tracer locations 4, and a connector 5. Although not shown, it should be understood that a connector 5 may be present on each opposite end of the cable 3 to allow the cable assembly 1 to act as a patch cord between components of a network. The connector 5 may vary widely depending on the nature of the cable 3 and the components being connected. The specific connector 5 selected should match the port configuration of the network component and will vary based upon the quantity and type of signals being transmitted by the cable 3. In those instances in which the cable 3 includes connectors 5, the distance between the connectors 5 defines a length for the cable 3. The cables 3 of the present disclosure are not specifically limited in their length. Rather, the cable 3 may have any suitable length. For example, in some instances, the cable 3 has a length of at least about 1 meter and up to several tens of meters, such as one-hundred meters.

Figure 4:
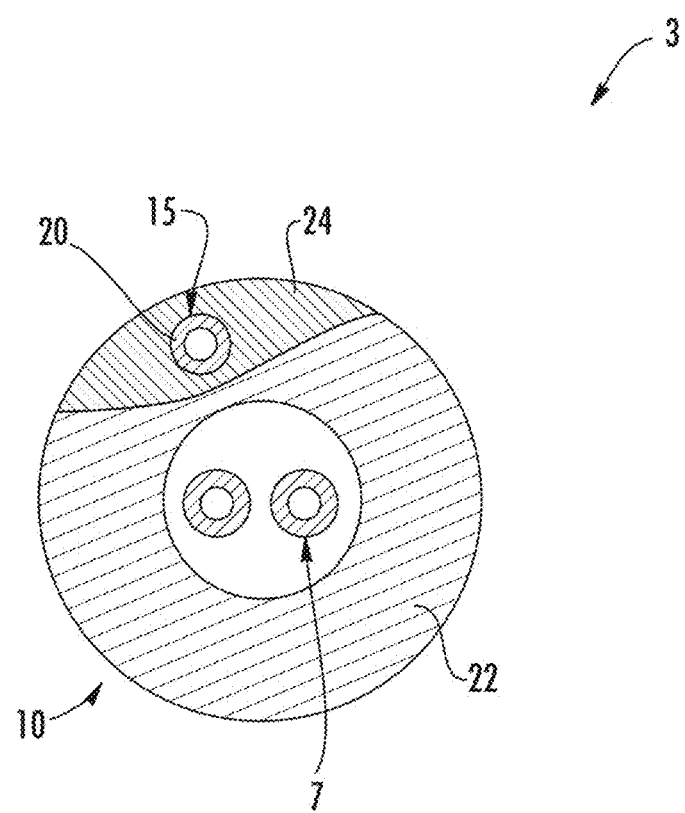
FIG. 4 is a cross-sectional view of the cable assembly of FIG. 3 along the plane IV-IV.

FIG. 4 illustrates a cross section of the cable 3 representing one possible embodiment. The cable 3 may include one or more data transmission elements 7. Two such data transmission elements 7 are shown in FIG. 4. The data transmission elements 7 may be of the same type or different types as compared to one another. Generally, a data transmission element 7 is a structure capable of carrying a data signal from one end of the cable 3 to the other. The data transmission element 7 may be configured to transmit an electrical signal, for example, using a copper wire or other electrically conductive material. Alternatively, or in addition, the data transmission element 7 may be configured to transmit an optical signal by conducting electromagnetic waves such as ultraviolet, infrared, or visible light to carry data from one location to another. In some embodiments, the cable 3 may be more appropriately referred to as a conduit, without having any data transmission elements 7. Instead of transmitting a data signal, these cables 3 may transmit fluids such as air or liquid. These cables 3 may be appropriate for use in a medical setting such as IV lines or oxygen tubing.

The cable 3 includes a jacket 10. The jacket 10 may be a hollow tube forming a conduit that substantially surrounds the data transmission elements 7 and that defines an outer surface of the cable 3. Alternatively, the data transmission elements 7 may be only partially embedded within the jacket 10.

Cables 3 of the present disclosure include a tracer element 15. The tracer element 15 is provided to enable an operator to identify the cable 3 at one or more areas along the cable 3. The operator can visually identify the tracer element 15 with or without special equipment, such as an IR camera.

One example of a tracer element 15 is a side-emitting optical fiber 20 used to identify one or more portions of the cable 3. The side-emitting optical fiber 20 may be referred to interchangeably as a side-emitting optical waveguide herein. Therefore this disclosure does not intend to differentiate between the terms "optical fiber" and "optical waveguide" per se. The side-emitting optical fiber 20 may conduct nonvisible light or visible light, such as green light at approximately 532 nm. Red light, blue light, or a combination thereof could also be used to assist with tracing the cable 3. Green light may be used due to the relative high degree of sensitivity of the human eye to green light.

As seen in FIG. 4, the side-emitting optical fiber 20 may be embedded within a portion of the jacket 10. In alternative embodiments, the side-emitting optical fiber 20 could be adjacent to the data transmission elements 7 inside a cavity formed by the jacket 10 or coupled to an external surface of the jacket 10. If the side-emitting optical fiber 20 is within such the cavity of the jacket 10, the jacket 10 may have at least some areas that are highly transparent. In yet other embodiments, the entire jacket 10 may be transparent. In some embodiments, the side-emitting optical fiber 20 could be provided on or mounted to the outside of the jacket 10. Still referring to FIG. 4, the jacket 10 may include a pigmented portion 22 and an un-pigmented portion 24. The pigment used in the pigmented portion 22 may be selected to identify the nature of the cable 3 to one of ordinary skill in the art, based on the number, type, and arrangement of data transmission elements 7 therein. The side-emitting optical fiber 20 may be embedded within the un-pigmented portion 24. The un-pigmented portion 24 may include some pigment, but is typically more optically transparent than the pigmented portion 22. Therefore by locating the side-emitting optical fiber 20 within the un-pigmented portion 24, any light scattered from the side-emitting optical fiber 20 will be more visible.

Figure 5:
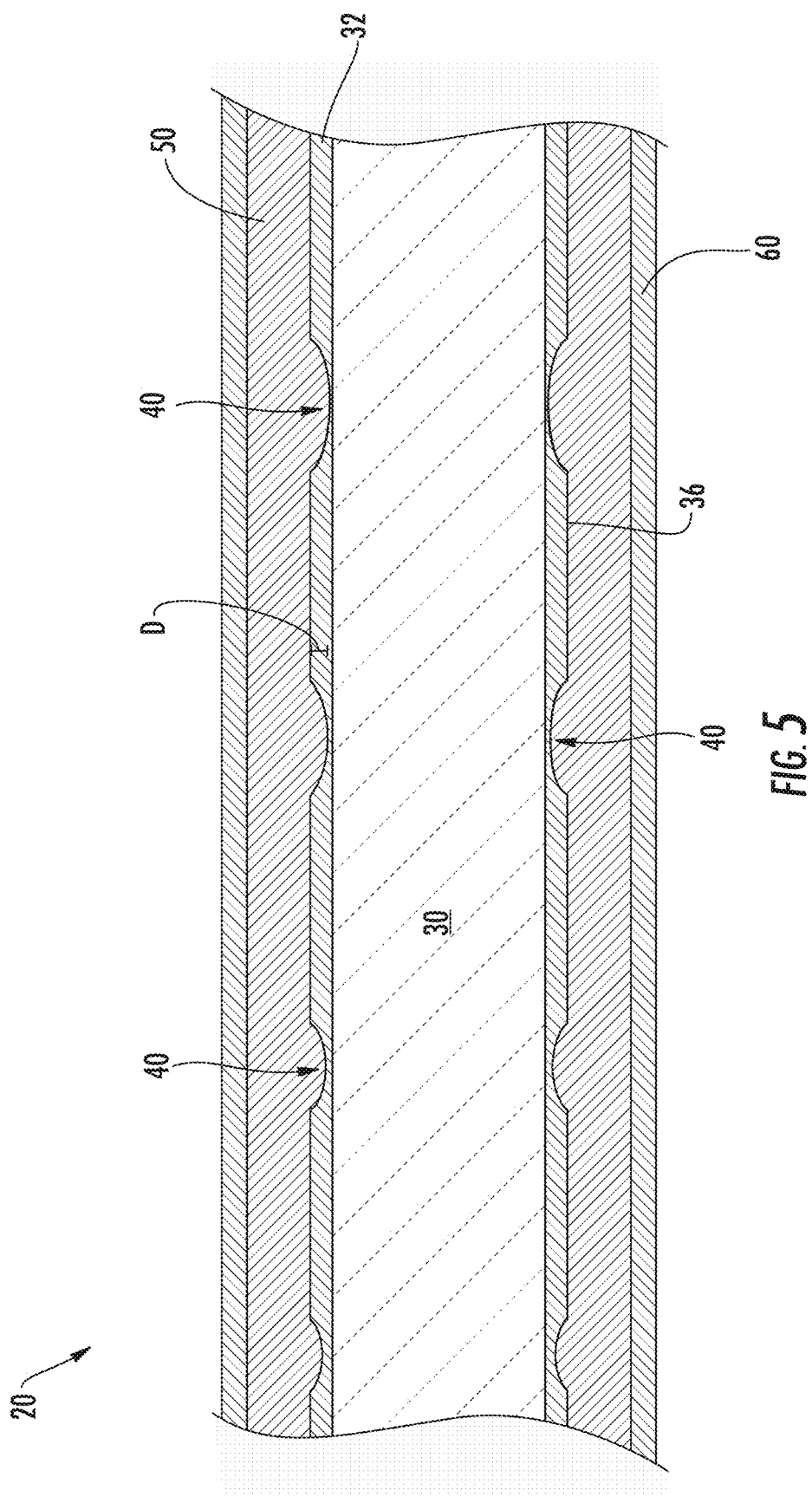
FIG. 5 is a lengthwise cross sectional view of a tracer element of the cable assembly according to embodiments of the present disclosure.

Turning to FIG. 5, the side-emitting optical fiber 20 includes at least a core 30 and a cladding 32. The core 30 may be made from glass, particularly silica-based glass, having a first index of refraction. Alternatively, the core 30 may be formed from a polymer. The size of the core 30 is not particularly limited, but in some embodiments diameters may be between and including about 100 microns and about 250 microns. The core may be, for example, 125 microns. Cores that are significantly smaller may be subject to damage from handling, and cores that are significantly larger may be subject to damage when bending.

In some embodiments, the core 30 may be a substantially solid core, generally free of voids or air pockets as found within the airline optical fiber type of diffusive optical fibers. In other embodiments, the core 30 may include mode coupling features 102, as described in more detail below. A core 30 that is free from voids may facilitate splicing, polishing, or other processing operations, which may be needed in some embodiments to make ends of the side-emitting optical fiber 20 compatible with a device for launching light into the side-emitting optical fiber 20 or receiving light from the side-emitting optical fiber 20.

The cladding 32 can be a polymer, such as fluoro-acrylate. In the embodiment illustrated in the drawings, the material for the cladding 32 is selected to have an index of refraction that differs from the index of refraction of the core 30. In some embodiments the index of refraction of the cladding 32 is lower than that of the core. In some embodiments, the indices of refraction produce a step-index optical fiber. In other embodiments, the side-emitting optical fiber 20 may be a trapezium or triangular index fiber. The cladding 32 closely surrounds the core 30 to help maintain light within the side-emitting optical fiber 20. The cladding 32 may have a thickness between about 4% and about 40% of the diameter of the core 30. For example, the cladding 32 may be between about 5 and about 50 microns thick from the surface of the core 30 to an exterior surface 36 of the cladding 32 when the core 30 has a diameter of 125 microns. The side-emitting optical fiber 20 may be a single mode fiber or a multi-mode fiber.

According to embodiments of the present description, scattering sites 40 are selectively provided at spaced apart locations on the cladding 32 along the length of the side-emitting optical fiber 20. Scattering sites 40 are areas where light, which is otherwise traveling along the side-emitting optical fiber 20, is scattered and therefore able to be emitted from the side of the side-emitting optical fiber 20. Light is schematically shown being emitted from the side-emitting optical fiber 20 by dashed lines in FIG. 6.

In some embodiments, scattering sites 40 are areas where the exterior surface 36 is modified, removed, deformed, damaged, or otherwise penetrated to produce optical surfaces tending to scatter light. The scattering sites 40 may penetrate the exterior surface 36 to extend partially or completed through the cladding 32 to the core 30. Additionally, some or all of the scattering sites 40 may be annular or otherwise generally ring shaped, extending around the entire circumference of the side-emitting optical fiber 20. In some embodiments, as understood from FIG. 6, each scattering site 40 does not extend around the full circumference of the side-emitting optical fiber 20. The individual scattering sites 40 may sweep an arc approximately 180 degrees, 90 degrees, or even less around the circumference. The scattering sites 40 may be aligned horizontally on the side-emitting optical fiber 20 or may be radially distributed around the circumference of the side-emitting optical fiber 20.

Figure 6:
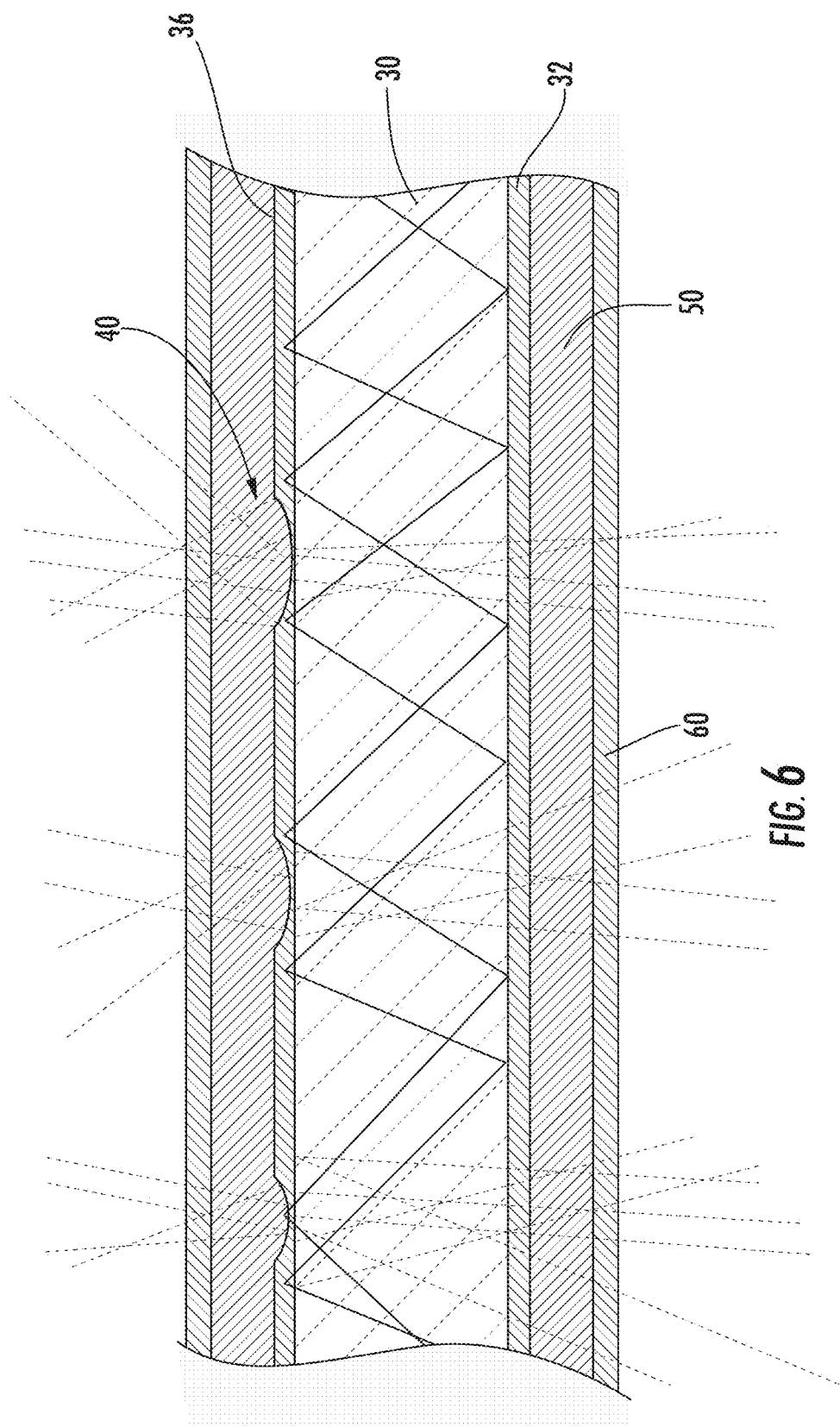
FIG. 6 is a schematic view of light propagating through and being scattered from the tracer element of FIG. 5.

Scattering sites 40 having a complete ring shape may provide the most uniformly scattered light, but a full ring is not believed necessary to have light scatter in all 360 degrees around a lengthwise axis of the side-emitting optical fiber 20 and/or light to be seen 360 degrees a lengthwise axis of the cable 3. The scattering sites 40 scatter light generally in all directions with varying intensity. Therefore, each scattering site 40 directs light immediately out of an adjacent portion of the exterior surface 36, and also directs light back through the core 30 and out an opposite portion of the exterior surface 36 as schematically illustrated in FIG. 6. Scattering light from the side-emitting optical fiber 20 about 360 degrees can be desired to avoid directionality in the side-emitting optical fiber 20. Directionality may require more precise orientation of the side-emitting optical fiber 20 with the jacket 10 and cable 3. If the side-emitting optical fiber 20 emitted light in a particular direction, that emission direction may need to be oriented toward the exterior of the cable 3 to be visible. Again, by scattering light 360 degrees around the side-emitting optical fiber 20, the side-emitting optical fiber allows the scattered light be to be seen from any viewpoint around the lengthwise axis of the cable 3. As noted above, the scattering sites 40 may also be radially distributed around the circumference of the side-emitting optical fiber 20 to avoid directionality in the side-emitting optical fiber 20.

Figure 10:
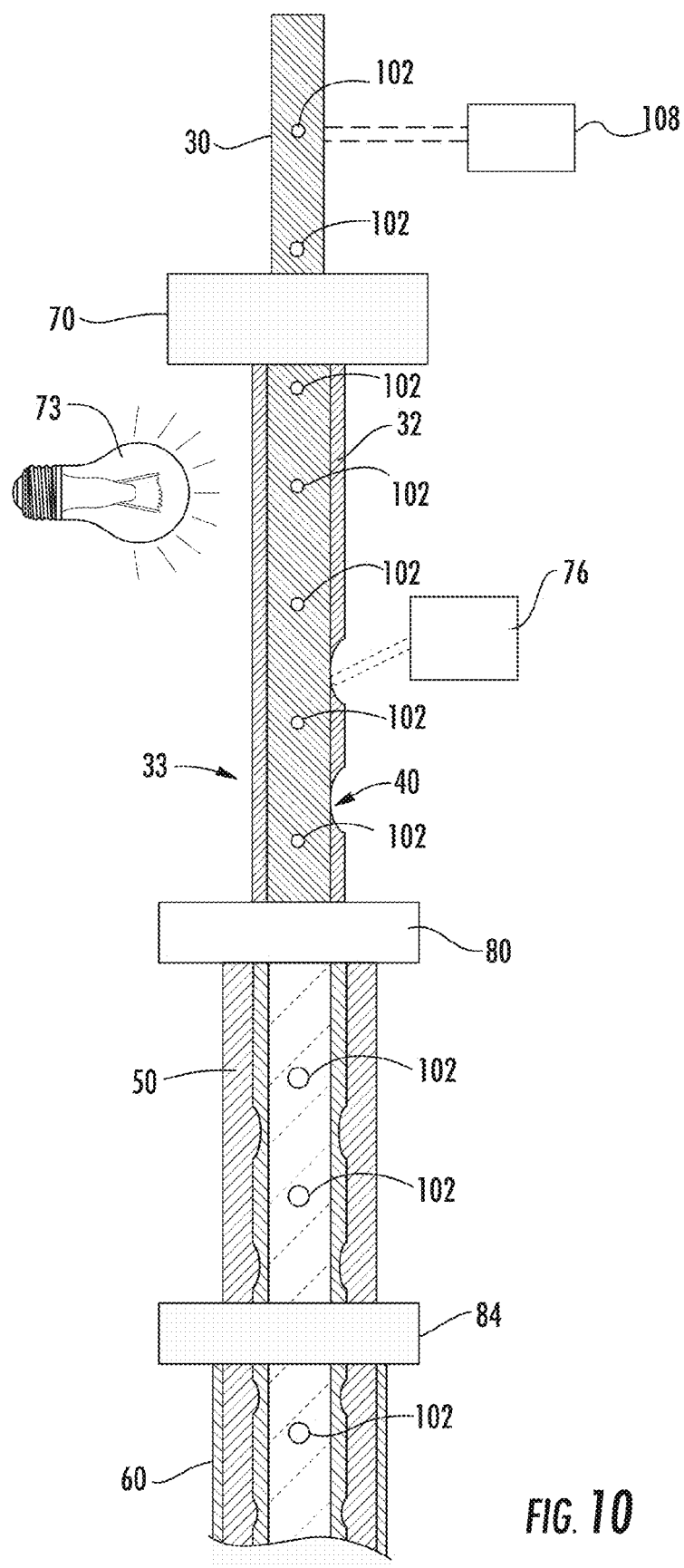
FIG. 10 shows a method of forming a side-emitting optical fiber as the tracer element of FIG. 7.
Figure 11:
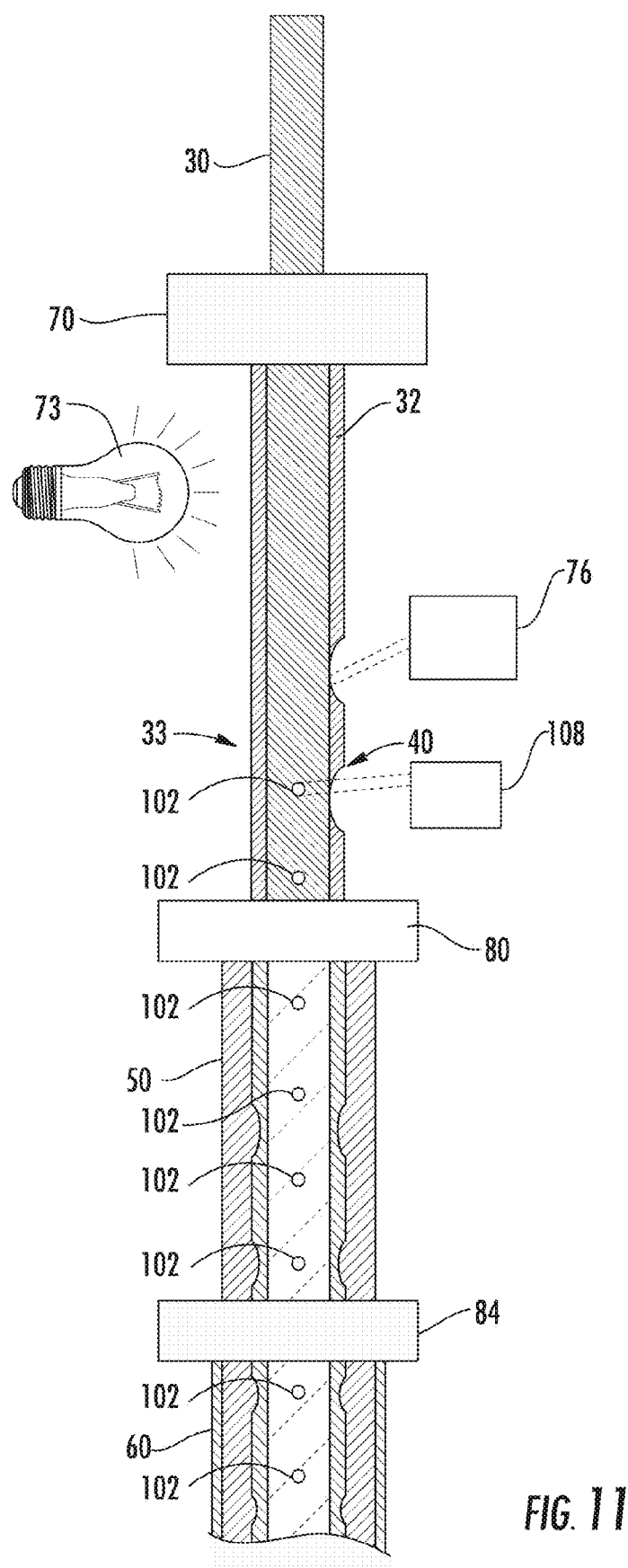
FIG. 11 shows another method of forming a side-emitting optical fiber as the tracer element of FIG. 7.

The scattering sites 40 may be produced by a variety of mechanical, optical, or chemical processes, and this disclosure is not limited to any of these particular methods. In the embodiment of FIGS. 10 and 11, for example, the scattering sites 40 are produced as the result of ablation caused by impact with high intensity light from a laser 76. The ablation process removes some of the cladding 32 and leaves behind an optically rough surface portion. Several characteristics of the scattering sites 40 may be refined to help ensure that the extraction of light from the core 30 and cladding 32 to provide tracer locations 4 along the cable 3 are each visible in a well-lit environment. The characteristics may also be refined based the practical manufacturability of the cable 3 and side-emitting optical fiber 20. For example, the separation P between the scattering sites 40 may be selected to address the unique challenges associated with cable assemblies for data centers or similar network locations. In one embodiment, the scattering sites 40 are at least about 1 cm apart and less than about 1 meter apart. Scattering sites 40 that are too close together approach a uniform emission along the length of the cable 3, and may lose the efficient use of light provided by the discrete tracer locations 4. Scattering sites 40 that are too far apart may lose the benefits of along-the-length tracer locations 4 and the ability to sufficiently trace the cable 3 in its environment with other cables. Additionally, scattering sites 40 that are too far apart may result in the scattering sites 40 being too far from the terminal end of the cable 3 to provide a tracer location 4 within the appropriate equipment rack 110. An approximate separation P of about 10 cm may balance the light efficiency and traceability benefits, keeping in mind that several of the tracer locations 4 may be hidden behind other cables, effectively increasing the relative spacing between each tracer location 4. In some embodiments, the separation P may facilitate identifying the overall length of the cable 3. For example, the approximate separation P may be about 1 meter in some embodiments, thereby allowing a person to count the tracer locations 4 to approximate the total length of the cable 3 in meters. In other embodiments, the approximate separation P may be about 1 foot, thereby allowing a person to count the tracer locations 4 to estimate the total length of the cable 3 in feet.

As used herein, the cable 3 and the side-emitting optical fiber 20 may be described as each having respective launch ends and traced ends. The launch ends can be the known, accessible end of the cable 3 where the network operator would provide (i.e. launch) tracer light into the side-emitting optical fiber 20. The respective traced ends should therefore be understood as the respective ends of the cable 3 and optical fiber 20 opposite the launch ends. The traced end, particularly of the cable 3, is the end of the cable that the operator needs to identify by the tracing process. It should be understood that in some embodiments these ends are not fixed. In other words, for any given operation either end of the cable 3 may constitute the launch end and the traced end. In other embodiments, one end of the cable 3 is the dedicated launching end while the other end of the cable is the dedicated tracing end.

The size of each scattering site 40 may also be chosen based on the challenges associated with cable assemblies for data centers or similar network locations. The size of each scattering site 40 may include the arc sweep around the side-emitting optical fiber 20, as well as the overall depth and diameter of the scattering site 40. The size of each scattering site 40 may also include the magnitude M (FIG. 3) along the length of the side-emitting optical fiber 20 (i.e., "magnitude M" refers to the length of each scattering site measured parallel to the lengthwise axis of the side-emitting optical fiber 20). In some embodiments, the magnitude M may be between about 10 microns and about 50 mm, or even between about 0.5 mm and about 4 mm (such as about 2 mm for one specific example).

Further, the scattering sites 40 may be characterized by their depth D (FIG. 5) from the exterior surface 36 to a point closest to the core 30. One skilled in the art will appreciate that light traveling through the side-emitting optical fiber 20 may be described as forming a bell shaped distribution pattern relative to the central lengthwise axis of the core 30. The edges of the distribution, the part traveling through the cladding 32, may be referred to as the evanescent tail of the propagating light. It is this tail that is clipped by the scattering sites 40 and sent traveling in all directions. Therefore, the deeper each scattering site 40 penetrates into the cladding 32, the greater portion of the light distribution that is available for scattering by the scattering site 40.

Therefore, selecting the depth D of each scattering site 40 balances the desire to scatter out a sufficient amount of light to be visible in a well-lit room with the desire to maintain enough light within the side-emitting optical fiber 20 to provide sufficient light to each of the scattering sites 40 downstream.

In some embodiments, the scattering sites 40 may remove the cladding 32 completely down to the core 30. In one example, the scattering sites 40 do not completely remove the cladding 32 at the given location. Depths D may include between about 1% to about 100% of the thickness of the cladding 32. Yet again, the depth D of each scattering site 40 may be substantially consistent along the length of the cable 3. Alternatively, the depth D may vary as a function of the distance from an end of the cable 3 or side-emitting optical fiber 20. For example the depth D may increase with distance from the launch end. The depth D is generally defined as a maximum distance toward the core 30 or a maximum percentage of cladding removal for any given scattering site 40. The process used, and resulting surface profile of each scattering site 40, is likely to render a range of depths for any given scattering site 40. In some embodiments, the range of depths may be minimized and essentially random. In other embodiments, the range of depths may be provided with a general profile, like the concave areas represented in FIGS. 5 and 6.

The side-emitting optical fiber 20 may include at least one coating 50 applied to the exterior surface 36 and scattering sites 40 of the cladding 32. The coating 50 may be between about 10 and about 70 microns thick. The coating 50 may be provided as a layer of protection for the core 30 and the cladding 32. The coating 50 should be at least partially translucent, if not fully transparent, in locations corresponding with the scattering sites 40. The coating 50 may have light transmission windows or have generally uniform light transmission characteristics. The coating 50 may be made from acrylate. The refractive index of the coating 50 may be 1.56 relative to the refractive index of the optical cladding 32 of 1.35.

The side-emitting optical fiber 20 may also include an ink layer 60 applied to the coating 50. The ink layer 60 may be selectively applied to locations corresponding with the scattering sites 40. Alternatively, the ink layer 60 may be uniformly applied to the coating 50. The ink layer 60 may have further scattering elements, such as titanium oxide spheres, configured to diffuse the light being emitted from the side-emitting optical fiber 20. The ink layer 60 is configured to provide each tracer location 4 with an approximate Lambertian distribution pattern.

As noted above, the scattering sites 40 that are furthest from the launch end may be dull compared with the scattering sites 40 closest to the launch end. Long cables 3 may experience this dimming of light emitted by scattering sites 40 that are further from the launch end due to the length of the cable 3 and the number of scattering sites 40 along the length of the cable 3. In these embodiments, the required launch light power is dictated by the amount of light emitted from the farthest scattering site 40 (i.e., the scattering site 40 at the opposite end of the cable 3 from the launch end). Thus, increased launch light power may be required to ensure that the farthest scattering sites 40 emit sufficient light. However, increasing the launch light power can have negative side effects, such as increasing energy costs, increasing battery consumption and increasing eye safety concerns.

As discussed above, light traveling through the side-emitting optical fiber 20 may be described as forming a bell shaped distribution pattern relative to the central lengthwise axis of the core 30. A majority of the light traveling through the side-emitting optical fiber 20 travels near the central lengthwise axis of the core 30 and includes low order modes of light. The low order modes of light in a side-emitting optical fiber 20 tend to travel along the side-emitting optical fiber 20 close to a central lengthwise axis of the core 30 and make up a majority of the center of the bell shaped distribution pattern of light in the fiber 20. The edges of the distribution, which are small compared with the amount of light traveling near the central lengthwise axis of the core 30, travel along the side-emitting optical fiber through the edges of the core 30 and in portions of the cladding 32. The light traveling along the portions of the cladding 32 is often referred to as the evanescent tail of the propagating light. This light includes high order modes of light which, in a simplified geometric sense, bounce (i.e., alternate) back and forth between the core 30 and cladding 32. In a simplified sense, the high order mode light includes more bounces per unit distance in the side-emitting optical fiber 20 than the low order mode light. It is this evanescent tail that is clipped and emitted in all directions by the scattering sites 40. Each scattering site 40 diminishes the amount of light remaining in the evanescent tail of the propagating light. Thus, as the launch light propagates along the side-emitting optical fiber 20, the high order modes are preferentially emitted at the scattering sites 40 resulting in a modal volume that is rich in low order modes at large distances from the launch end of the cable 3. The term "high order mode light" is used herein to refer to light that has an effective refractive index between the cladding index of refraction and the average of the cladding and core refractive indices. As used herein, the term "low order mode light" refers to light that has an effective refractive index between the core index of refraction and the average of the cladding and core refractive indices. Thus, for example, in a side-emitting optical fiber 20 in which the core 30 has a refractive index of about 1.52 and the cladding 32 has a refractive index of about 1.50, the high order modes would have an effective refractive index between about 1.50 and about 1.51 and the low order modes would have an effective refractive index between about 1.51 and about 1.52.

Figure 7:
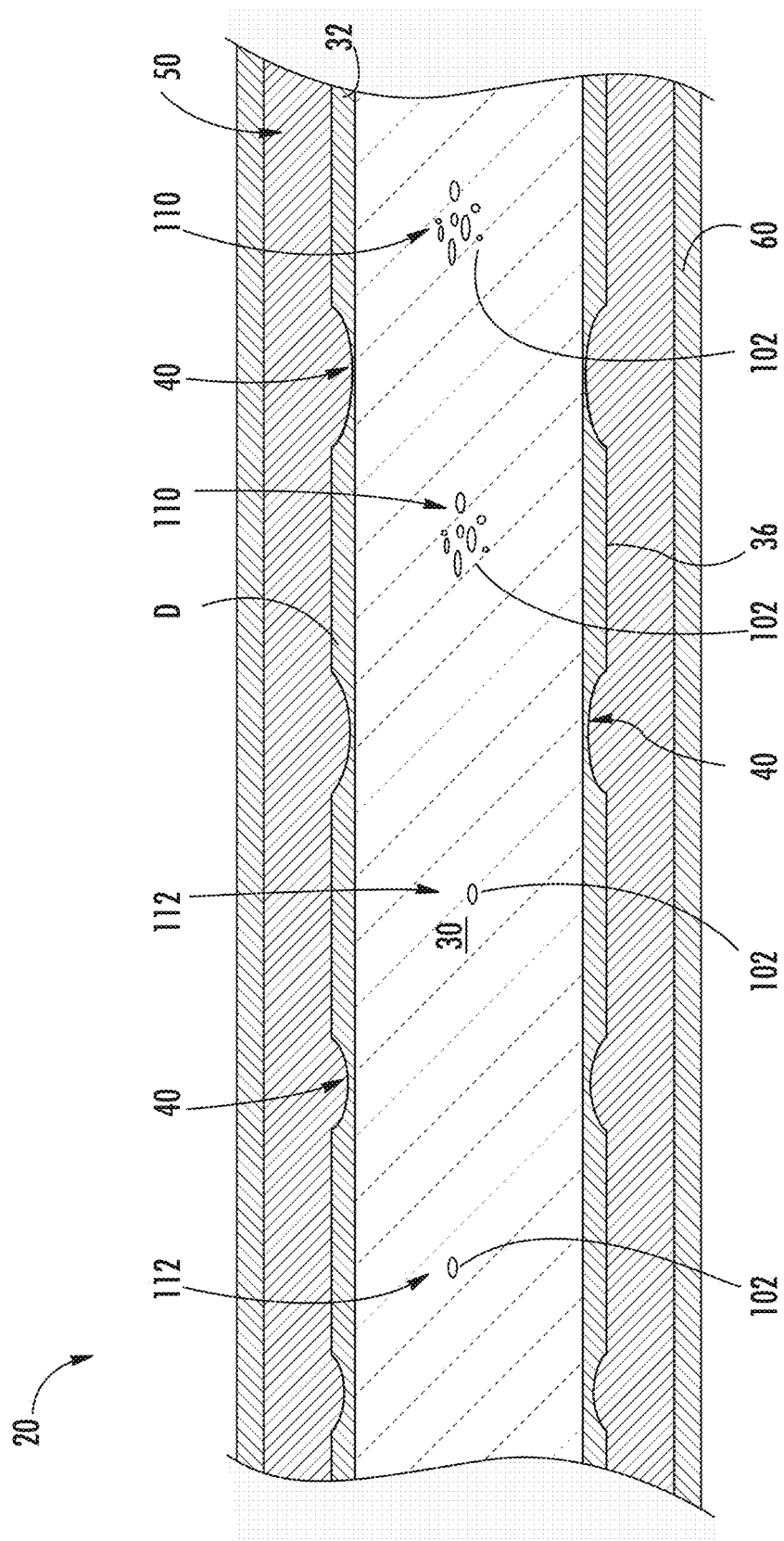
FIG. 7 is a lengthwise cross sectional view of another embodiment of a tracer element of a cable assembly according to embodiments of the present disclosure.

Referring now to FIG. 7, the side-emitting optical fiber 20 may include mode coupling features 102 distributed periodically along the length of the fiber 20 to maintain more uniformity in brightness at the scatting sites 40 along the length of a cable 3. A mode coupling feature 102 is any element in the side-emitting optical fiber 20 that changes the modal distribution of at least some of the light traveling along the side-emitting optical fiber. Thus, for example, a mode coupling feature 102 may change the relative amount of power carried by the side emitting optical fiber 20 between the LP01 mode and the LP11 mode. In some embodiments, mode coupling features 102 in the side-emitting optical fiber 20 change at least some of the low order mode light to high order modes thereby increasing the light emitted from the scattering sites 40 at large distances from the launch end of the fiber 20. Such a redistribution of the light along the length of the fiber 20 enables a more uniform intensity of light emitted from all the scattering sites 40 and reduces the required launch power at the launch end of the cable 3 for energy considerations and eye safety concerns.

Several example mode coupling features 102 will now be described. In some embodiments, the mode coupling features 102 may be areas of the core 30 or cladding 32 that have a different index of refraction than the immediately surrounding portions of the core 30 or cladding 32. For example, the mode coupling features 102 may be index perturbations in the core 30. Many materials (including polymethyl methacrylate (PMMA)) are photosensitive and the refractive index of the material can be permanently changed by exposure to UV light. Thus, to create an index perturbation, the refractive index of small regions of the core 30 are altered by illuminating these regions with UV light. The refractive index change is the greatest at the focused spot (inside the core 30) and gradually decrease away from this spot until it matches the index of the unperturbed (i.e., unilluminated) core 30.

In another example, the mode coupling features 102 are variations in the geometry of the core 30. For example, a deformation of the diameter of the outer surface of the core 30, which is ideally cylindrical in shape, may be created during the drawing process used to create the side-emitting optical fiber 20. By periodically (or aperiodically) changing the draw speed, the diameter of the outer surface of the side-emitting optical fiber 20 can be altered in accordance with the variation in draw speed. In this way, a prescribed number of variations in the diameter of the outer surface of the core 30 with varying magnitudes and spacings can be created. When light contacts the outer perimeter or surface of the core 30, or the interface between the core 30 and the cladding 32, low order modes of light may change to high order modes of light thus increasing the light emitted from the subsequent scattering sites 40.

In some embodiments, a single side-emitting fiber 20 can include more than one type of mode coupling feature 102. For example, the side-emitting optical fiber 20 may include one or more index perturbations and one or more variations in the geometry of the core 30. In some embodiments, the mode coupling features 102 are periodically spaced along the length of the side emitting optical fiber 20. In the embodiment illustrated in FIG. 7, for example, the mode coupling features 102 are each located between a pair of scattering sites 40. Although only a single mode coupling feature 102 is shown between certain scattering sites 40, as shown at reference numbers 112, in other embodiments a plurality of mode coupling features 102 are located between each pair of scattering sites 40, as illustrated at reference numbers 110. In other embodiments, one or more mode coupling features 102 may be aligned with the scattering sites 40 along the length of the fiber 20. In yet other embodiments, the mode coupling features 102 are positioned periodically along the fiber 20 without any specific correlation to the location of the scattering sites 40.

The mode coupling features 102 can be spaced at regular, repeating intervals along the length of the side-emitting optical fiber 20 or can be placed sporadically along the side-emitting optical fiber 20. For example, the mode coupling features 102 can be spaced regularly along the length of the side-emitting optical fiber 20 between about 4 cm and about 1 m apart. In some cases, a distance between adjacent mode coupling features 102 varies as a function of the distance from an end of the side-emitting optical fiber 20.

In some embodiments, a plurality of mode coupling features 102 may be group together at periodic locations along the length of the side-emitting optical fiber 20, as illustrated at reference number 110. In other embodiments, the mode coupling features 102 are spaced from each other, as illustrated at reference number 112.

Figure 8:
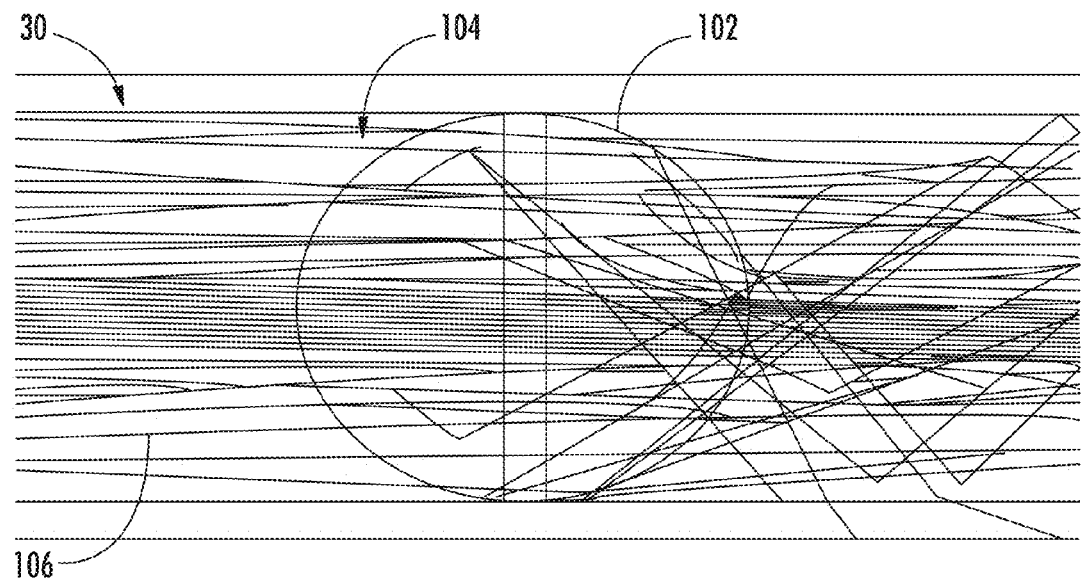
FIG. 8 is a schematic view of light propagating through an ellipsoidal index perturbation according to embodiments of the present disclosure.

FIG. 8 shows a schematic illustration of light beams 106 in a side-emitting optical fiber 20 interacting with a mode coupling feature 102. The mode coupling feature 102 converts at least some of the low order light into high order light thereby increasing the amount of light available at subsequent scattering sites 40. The changing, or "coupling," of low order light to the high order light results in a more uniform intensity of light emitted by the side-emitting optical fiber 20 enabling a reduction in the required launch power.

The mode coupling feature 102 in FIG. 8 is an index perturbation in the core 30 of the side-emitting optical fiber 20. The index perturbation is in the form of a small, ellipsoidal area having a different index of refraction from the surrounding areas of the core 30. In other embodiments, the index perturbation may have other shapes, volumes and sizes. In some embodiments, for example, the index perturbations are randomly shaped volumes created by a focused beam of laser light.

Figure 9:
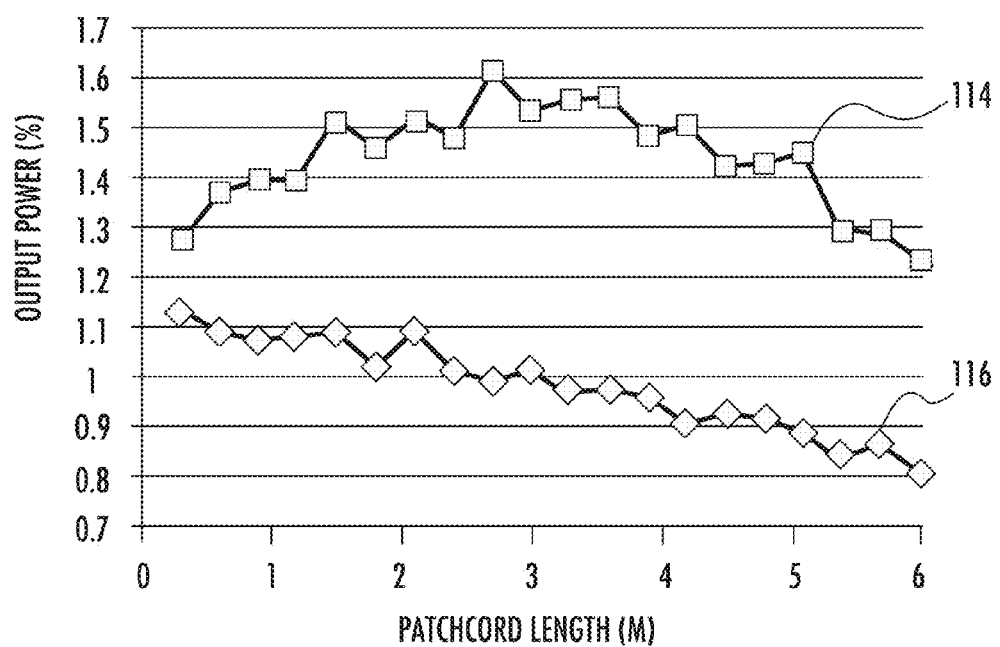
FIG. 9 is a graph showing output light power versus fiber length for a fiber with mode coupling features and a fiber without mode coupling features.

FIG. 9 is a graph showing output light power versus fiber length for a first fiber 114 that includes mode coupling features 102 and a second fiber 116 that does not include mode coupling features 102. The first fiber 114 is a PMMA plastic optical fiber (POF) that has a 200 µm diameter and is approximately 6 m long. The first fiber 114 has a low angle launch, scattering sites 40 that are approximately 0.3 m apart, and periodically-spaced mode coupling features 102. As shown in FIG. 9, the mode coupling features 102 of the first fiber 114 produced a more uniform output along the length of the fiber 114. In addition, the lowest output power of the scattering sites 40 on the first fiber 114 is 50% greater than the lowest output power of the scattering sites 40 on the second fiber 116. As such, a light source with reduced intensity can be used with the first fiber 114 to obtain the same light power, thereby reducing power consumption and eye safety risks.

The second fiber 116 is a PMMA POF that does not include periodically-spaced mode coupling features 102. Like the first fiber 114, the second fiber 116 has a 200 µm diameter, a length of approximately 6 m and a low angle launch. The scattering sites 40 of the second fiber 116 are approximately 0.3 m apart. As shown in FIG. 9, the output power of the second fiber 116 decreases with increasing fiber length. The high order modes of light in the second fiber 116 are depleted much more rapidly than the low order modes of light and the overall effect is that the light emitted at the scattering sites 40 decreases in intensity as a function of the length of the fiber 116.

The side-emitting optical fiber 20 of the present disclosure has been described for use in facilitating traceability of a cable 3. In some embodiments, the side-emitting optical fiber 20 may have uses independent of the cable 3. For example, the side-emitting optical fiber 20 may not be used for tracing at all, but may itself provide decorative or functional illumination or indication. The cable 3 having the above-described optical fiber 20 may be pre-connectorized or may be sold without one or more connectors.

Side-emitting optical fibers 20 according to this disclosure may be manufactured according to processes schematically illustrated in FIGS. 10 and 11. Referring initially to the process illustrated in FIG. 10, a core 30, such as a glass core may be fed, pulled, or drawn, or otherwise passed at typical telecom speeds through a first liquid die block 70. In some embodiments, a light source 108 then produces mode coupling features 102 in the core 30. In some cases, the light source 108 exposes portions of the core 30 to UV light to change the index of refraction of the portion of the core 30 creating one or more index perturbations in the core 30. In other instances, the UV light may modify the diameter of the outer surface of the core 30 to create a deformation of the diameter of the outer surface of the core 30 of the side-emitting optical fiber 20.

A cladding 32 is then deposited or otherwise applied to the core 30. In one example, the process for adding the cladding 32 may be a pultrusion process. The cladded core 33 may pass through a curing station 73 where the cladding 32 is at least partially cured. In one example, the curing station 73 may emit UV light from lamps or LEDs to rapidly, optically cure the cladding 32.

After the cladding 32 is at least partially cured, the scattering sites 40 may be created by ablating the exterior surface 36 with at least one high intensity light source, such as a laser 76, as the cladded core 30 is drawn past. One or more light sources positioned around the core 30 may be provided to achieve the desired arc sweep for each scattering site 40. As discussed above, the individual scattering sites 40 may sweep an arc of 360 degrees or less around the circumference of the side-emitting optical fiber 20 and may have characteristics (such as, for example, magnitude M and depth D) based on the intended use of the side-emitting optical fiber 20.

The light source(s) may be positioned to produce scattering sites 40 that are aligned on a single side of the side-emitting optical fiber 20 (i.e., horizontally aligned scattering sites 40) or multiple sides of the side-emitting optical fiber 20 (i.e., scattering sites 40 that are radially distributed around the circumference of the side-emitting optical fiber 20). It may be desirable to produce radially-distributed scattering sites 40 to improve the overall light diffusion of the side-emitting optical fiber 20 when embedded in the outer jacket 10. For example, in an embodiment having horizontally-aligned scattering sites 40 some or all of the scattering sites 40 may be directed away from the un-pigmented portion 24. Thus, the overall light diffusion of the cable 3 may be reduced. However, by radially distributing the scattering sites 40 around the circumference of the cladding 32 at least some of the scattering sites 40 will be directed outwardly through the un-pigmented portion 24 regardless of the positioning of the side-emitting optical fiber 20 in the outer jacket 10.

Referring again to FIG. 10, production of the radially-distributed scattering sites 40 may be accomplished by spinning the core 30 while the core 30 is fed, pulled drawn, or otherwise passed through the first liquid die block 70. The rotation of the core 30 also rotates the attached cladding 32 as the cladding 32 passes the laser 76. This configuration enables a single, stationary laser 76 to produce scattering sites 40 that are radially distributed around the circumference of the side-emitting optical fiber 20. In this embodiment, the scattering sites 40 may form a helix around a central axis of the side-emitting optical fiber 20.

The scattering sites 40 can also be positioned radially around the circumference using other manufacturing methods. For example, the core 30 may be fed, pulled, drawn or otherwise passed through the first liquid die block 70 without rotation and instead multiple lasers 76 may be located around the circumference of the cladding 32 to create radially distributed scattering sites 40. The scattering sites 40 can also be created by one or more lasers 76 having optical elements, such as beam steering mirrors, to direct the laser beam at multiple radial locations around the cladding 32. In other embodiments, any combination of the foregoing can be used to create scattering sites 40 that are radially positioned around the circumference of the side-emitting optical fiber 20. For example, multiple lasers can be positioned around a rotating core 30 and cladding 32 to produce radially spaced scattering sites 40.

Figure 12:
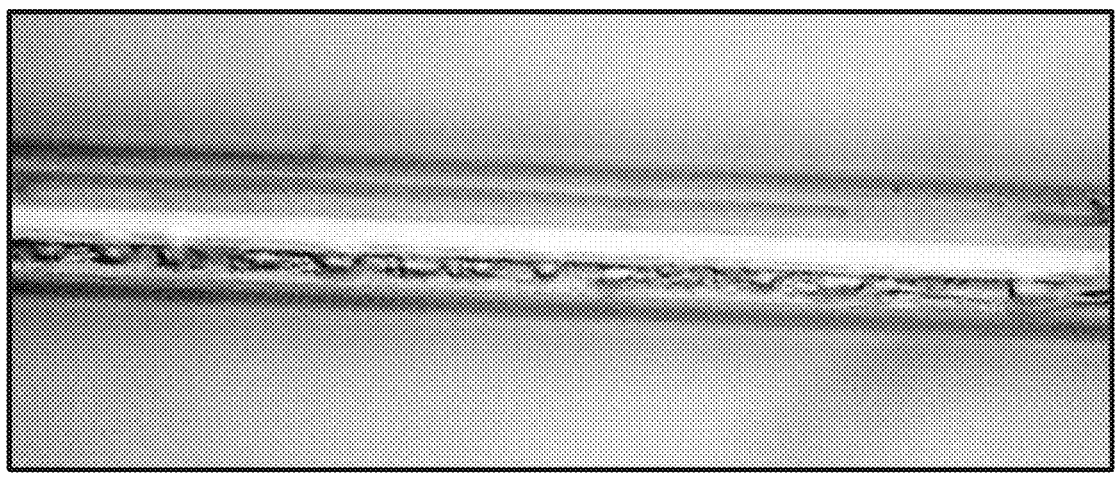
FIG. 12 shows example scattering sites of the side-emitting optical fiber as viewed under a microscope.

The high intensity light impacts the cladding 32 and forms the scattering sites 40 by vaporizing or burning off some of the cladding 32 while locally affecting other portions of the cladding 32 to produce the resulting locally roughened surface as shown in FIG. 12. The roughened surface may be described as having a series of defects or voids and can be generally described as a crater-like defects in the cladding 32. It should be recognized that the scattering sites 40 may be at least as large as the wavelength of the laser 76. Using a less collimated beam emitted from slightly further from the cladded core 33 can produce scattering sites 40 that are wider radially. The laser 76 is also likely to cause a hot spot on the cladding 32 that spreads beyond the area directly in path with the light beam.

In one embodiment, each laser 76 and light source 108 is a $CO_2$ laser, running at a repetition rate of 0.25 Hz to 100000 Hz with pulse energies of approximately 10000 W/s to 20000 W/s and pulse duration of 0.1 µs to 10 seconds. In another embodiment, for example, each laser 75 and light source 108 is running at a repetition rate of 50 Hz with a pulse duration of 0.8 µs. As will be appreciated by one of ordinary skill in the art, other types of lasers, emitting other wavelengths of light, and having other repetition rates, pulse energies and pulse durations may be used. For example, the repetition rate, pulse energy, and pulse duration may all be adjusted based on the draw rate of the cladded core 33 to achieve scattering sites 40 with the desired separation P, magnitude M, and depth D.

After the formation of the scattering sites 40 penetrating the exterior surface 36 of the cladding 32, the cladded core 33 may pass through a second liquid die block 80 where a similar pultrusion process may add a coating 50 over the ablated cladding. The coating 50 may be cured as it passing through a second curing station (not shown), or may be cured by other known means, such as temperature.

To provide a smoother, more Lambertian, light distribution pattern from the side-emitting optical fiber 20, a scattering ink layer 60 may be applied onto the coating 50 at a third liquid die block 84, or other processing unit, such as a spray applicator or printer.

In one embodiment, the side-emitting optical fiber 20 is manufactured on a single draw. As will be understood by those of skill in the art, the side-emitting optical fiber 20 can be produced in a continuous fashion on a single line, at a single location. Alternatively, it is possible that the side-emitting optical fibers 20 of the present description could also be produced by discrete steps at separate locations. For example, the core 30 may be wound up, transported between locations or manufacturing stations, and then run through the first liquid die block 70 for cladding. In another example, the scattering sites 40 may be created separate from the drawing of the cladded cores 33.

The side-emitting optical fibers 20 may continue on the single line directly to the manufacture of the cable 3. Alternatively, the side-emitting optical fiber 20 may be separately combined with the data transmission elements 7 and the jacket 10 in a different location or distinct time. In one embodiment, an extrusion or pultrusion process may be used to at least partially embed the side-emitting optical fiber 20 with the jacket 10 as the jacket 10 is being formed around the data transmission element 7. The side-emitting optical fiber 20 may be combined with at least one data transmission element 7 and a jacket 10 by a variety of processes known in the art, depending upon the particular type of cable 3 that is being manufactured.

Cable assemblies 1 may be made by cutting the cable 3 to a desired length and attaching the desired connectors 5 to each end according to processes known in the art, and dependent upon the type of cable assembly 1 being produced. For example, the connector 5 may be SC, LC, ST, FC, or MPO type connectors.

FIG. 11 illustrates another embodiment of a method of forming a side-emitting optical fiber 20. This method is similar to the method illustrated in FIG. 8 except that the mode coupling features 102 are formed after the formation of the scattering sites 40. Thus, the UV light source 108 contacts portions of the core 30 after the cladding 32 has been added around the core 30. As shown in FIG. 11, the light source 108 may be positioned between the light source 76 and the second liquid die block 80. In preferred embodiments, the UV light passes through the scattering sites 40 to create index perturbations or other types of mode coupling features 102 into the core 30.

The side-emitting optical fibers 20, cables 3 that incorporate the side-emitting optical fibers 20, and cable assemblies 1 that incorporate the cables 3, each have several advantages that will be apparent to one of ordinary skill in the art. Particularly, use of a side-emitting optical fiber 20 within the cable 3 provides an improved ability for a network operator to quickly and efficiently trace a particular cable assembly 1 so that a traced end can be identified from a predetermined launch end of the cable assembly 1. The side-emitting optical fibers 20 of this disclosure can be configured to facilitate the ability to trace along the full length of the cable 3. This may be helpful to identify tangles or knots. This may also help when the particular equipment rack 110, in which the traced end is connected, is unknown. For example, equipment racks 110 often have front doors that are kept closed. Tracing along the length of the cable 3 may help identify which rack to search. If a tracer location 4 were only on the traced end the cable 3, it may be hidden behind the door.

Another advantage pertains to the efficient use of tracer source light in the side-emitting optical fiber 20 by incorporating mode coupling features 102 into the core 30 of the fiber 20. In some embodiments, the mode coupling features 102 facilitate the use of longer cables 3, for example 10 m or more, while maintaining uniform brightness of the scattering sites 4. The reduction in variation of light emitted by the scattering sites 40 facilitated by the mode coupling features 102 also allows for a reduction in launch light power without sacrificing the visibility of the side-emitting optical fiber 20.

Use of laser ablation to form the mode coupling features 102 and the scattering sites 40 provides a processing step that can be readily controlled in terms of pulse rate, pulse energy, and duration to finely tune the scattering sites 40 and the mode coupling features 102 to achieve the best combination of traceability, uniform brightness, efficient use of tracer light and manufacturing efficiency.

Persons skilled in waveguide technology will appreciate additional variations and modifications of the devices and methods already described. Additionally, where a method claim below does not explicitly recite a step mentioned in the description above, it should not be assumed that the step is required by the claim. Furthermore, where a method claim below does not actually recite an order to be followed by its steps or an order is otherwise not required based on the claim language, it is not intended that any particular order be inferred.

The above examples are in no way intended to limit the scope of the present invention. It will be understood by those skilled in the art that while the present disclosure has been discussed above with reference to examples of embodiments, various additions, modifications and changes can be made thereto without departing from the spirit and scope of the invention as set forth in the claims.

What is claimed is:

1. A traceable cable having a length, comprising:
at least one data transmission element;
a jacket at least partially surrounding the at least one data transmission element; and
a side-emitting optical fiber extending along at least a portion of the length of the cable, wherein the side-emitting optical fiber comprises:
a core having a first index of refraction; and
a cladding having a second index of refraction that is different than the first index of refraction, the cladding substantially surrounding the core, the cladding having an exterior surface,
wherein the cladding comprises spaced apart scattering sites, the scattering sites being capable of scattering light so that the scattered light is emitted from the side-emitting optical fiber at discrete locations,
wherein the core further comprises one or more mode coupling features capable of changing at least some low order mode light in the side-emitting optical fiber to high order mode light,
wherein, when light is transmitted through the side-emitting optical fiber, light scattered from the side-emitting optical fiber allows the cable to be traced along at least a portion of the length thereof,
wherein the high order mode light has an effective refractive index between a cladding refractive index and an average of the cladding refractive index and a core refractive index, while low order mode light has an effective refractive index between the core refractive index and the average of the cladding refractive index and the core refractive index.

2. The traceable cable of claim 1, wherein the one or more mode coupling features comprises an index perturbation.

3. The traceable cable of claim 1, wherein the index perturbation is an ellipsoidal index perturbation.

4. The traceable cable of claim 1, wherein the one or more mode coupling features comprises a deformation of a geometry of the core of the side-emitting optical fiber.

5. The traceable cable of claim 1, wherein the one or more mode coupling features comprises an index perturbation and a deformation of a geometry of the core of the side-emitting optical fiber.

6. The traceable cable of claim 1, wherein the side-emitting optical fiber comprises a plurality of mode coupling features and at least one mode coupling feature of the plurality of mode coupling features is located between each pair of scattering sites.

7. The traceable cable of claim 6, wherein the plurality of mode coupling features are periodically spaced along the length of the traceable cable between about 4 cm and about 1 m apart.

8. The traceable cable of claims 6, wherein a distance between adjacent mode coupling features varies as a function of the distance from an end of the side-emitting optical fiber.

9. The traceable cable of claim 1, wherein the one or more mode coupling features is capable of changing at least some of the low order mode light into the high order mode light.

10. The traceable cable of claim 1, wherein the side-emitting optical fiber is at least partially embedded in the jacket.

11. The traceable cable of claim 1, wherein the side-emitting optical fiber is a step-index optical fiber.

12. The traceable cable of claim 1, further comprising a first connector at a first end of the traceable cable and a second connector at a second end of the traceable cable.

13. A method of forming a traceable cable that includes at least one data transmission element and a jacket at least partially surrounding the at least one data transmission element, the method comprising:
    forming a side-emitting optical fiber by:
        adding a cladding around a core to create an exterior surface, the cladding having a different index of refraction than the core;
        creating scattering sites in the exterior surface configured to allow the side-emitting optical fiber to scatter light therefrom;
        and modifying portions of the core to create mode coupling features capable of changing at least some low order mode light in the side-emitting optical fiber to high order mode light, and
    at least partially embedding the side-emitting optical fiber within the jacket so that the side-emitting optical fiber extends along at least a portion of a length of the cable;
    wherein modifying portions of the core to create mode coupling features comprises exposing the portions of the core to UV light;
    wherein the portions of the core are exposed to UV light to create the mode coupling features after the cladding is added around the core and after portions of the cladding have been selectively ablated to create the scattering sites.

14. The method of claim 13, wherein modifying portions of the core to create mode coupling features comprises deforming a diameter of an outer surface of the core.

15. The method of claim 13, wherein modifying portions of the core to create mode coupling features comprises both exposing the portions of the core to UV light and deforming a diameter of an outer surface of the core of the side-emitting optical fiber.

16. The method of claim 13, further comprising securing a first connector at a first end of the traceable cable and securing a second connector at a second end of the traceable cable.

17. A traceable cable having a length, comprising:
    at least one data transmission element;
    a jacket at least partially surrounding the at least one data transmission element; and
    a side-emitting optical fiber incorporated with and extending along at least a portion of the length of the cable, wherein the side-emitting optical fiber is at least partially embedded in the jacket, the side-emitting optical fiber comprising:
        a core having a first index of refraction; and
        a cladding having a second index of refraction that is different than the first index of refraction, the cladding substantially surrounding the core, the cladding having an exterior surface,
    wherein the cladding comprises spaced apart scattering sites penetrating the exterior surface, the scattering sites being capable of scattering light so that the scattered light is emitted from the side-emitting optical fiber at discrete locations,
    wherein the core further comprises spaced apart mode coupling features capable of changing at least some low order mode light in the side-emitting optical fiber to high order mode light, wherein each mode coupling feature is located between a pair of the scattering sites,
    wherein, when light is transmitted through the side-emitting optical fiber, light scattered from the side-emitting optical fiber allows the cable to be traced along at least a portion of the length thereof,
    wherein the high order mode light has an effective refractive index between a cladding refractive index and an average of the cladding refractive index and a core refractive index, while low order mode light has an effective refractive index between the core refractive index and the average of the cladding refractive index and the core refractive index.

* * * * *